US012767162B2

(12) United States Patent
Ota et al.

(10) Patent No.: US 12,767,162 B2
(45) Date of Patent: Oct. 20, 2026

(54) ALARM SYSTEM

(71) Applicant: TOYOTA JIDOSHA KABUSHIKI KAISHA, Toyota (JP)

(72) Inventors: Takehira Ota, Inazawa (JP); Ryusaku Yamamoto, Itabashi-ku (JP); Kohei Watanabe, Adachi-ku (JP); Shinya Hirosawa, Nisshin (JP); Yuto Kaida, Nagoya (JP); Shintaro Matsutani, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 74 days.

(21) Appl. No.: 18/908,792

(22) Filed: Oct. 8, 2024

(65) Prior Publication Data

US 2025/0136138 A1 May 1, 2025

(30) Foreign Application Priority Data

Oct. 31, 2023 (JP) ................................. 2023-186823

(51) Int. Cl.

| | |
|---|---|
| ***B60W 50/14*** | (2020.01) |
| ***B60K 35/28*** | (2024.01) |
| ***B60W 30/16*** | (2020.01) |
| ***B60W 40/08*** | (2012.01) |
| ***G06V 20/59*** | (2022.01) |
| ***G06V 40/10*** | (2022.01) |

(52) U.S. Cl.

CPC ............ *B60W 50/14* (2013.01); *B60K 35/28* (2024.01); *B60W 30/16* (2013.01); *B60W 40/08* (2013.01); *G06V 20/597* (2022.01); *G06V 40/10* (2022.01); *B60K 2360/166* (2024.01); *B60K 2360/178* (2024.01); *B60K 2360/1868* (2024.01); *B60W 2040/0818* (2013.01); *B60W 2050/143* (2013.01); *B60W 2050/146* (2013.01); *B60W 2420/403* (2013.01); *B60W 2520/10* (2013.01); *B60W 2540/229* (2020.02); *B60W 2554/802* (2020.02)

(58) Field of Classification Search

None

See application file for complete search history.

(56) References Cited

U.S. PATENT DOCUMENTS

| | | | | |
|---|---|---|---|---|
| 10,336,323 | B2 * | 7/2019 | Feit | B60W 10/18 |
| 10,627,813 | B2 * | 4/2020 | Tsuji | B60K 35/10 |
| 10,668,924 | B2 * | 6/2020 | Lee | B60W 30/143 |

(Continued)

FOREIGN PATENT DOCUMENTS

| | | | | |
|---|---|---|---|---|
| CN | 111873799 A | * 11/2020 | | B60K 35/60 |
| DE | 102022107478 A1 | * 10/2023 | | B60K 35/28 |

(Continued)

*Primary Examiner* — Fekadeselassie Girma

(74) *Attorney, Agent, or Firm* — KENJA IP LAW PC

(57) ABSTRACT

An alarm system is an alarm system to be mounted in a vehicle, and includes a display, an imager, and a controller. The display is used for displaying information for an in-vehicle apparatus. The imager is capable of acquiring an image including a face of a driver. The controller displays information regarding a travel condition of the vehicle on the display, upon determining, based on the image, that a situation in which the driver looks at the display has continued for a predetermined time period or longer.

6 Claims, 5 Drawing Sheets

(56) References Cited

U.S. PATENT DOCUMENTS

| | | | | |
|---|---|---|---|---|
| 11,772,615 | B2 * | 10/2023 | Kamada | B60K 28/06 701/70 |
| 12,441,349 | B2 * | 10/2025 | Yamaguchi | G06V 20/597 |
| 2005/0273216 | A1 | 12/2005 | Imai et al. | |
| 2019/0256106 | A1 * | 8/2019 | Lee | B60W 50/14 |
| 2021/0282636 | A1 * | 9/2021 | Zinser | G02B 27/01 |
| 2022/0080994 | A1 * | 3/2022 | Nomoto | B60W 50/14 |
| 2023/0105672 | A1 * | 4/2023 | Tojo | G07C 5/0808 701/34.4 |
| 2024/0116363 | A1 * | 4/2024 | Rawat | B60K 35/00 |
| 2024/0140434 | A1 * | 5/2024 | Abe | B60W 30/143 |
| 2024/0174247 | A1 * | 5/2024 | Yamaguchi | B60W 40/09 |
| 2024/0326857 | A1 * | 10/2024 | Cho | B60K 35/00 |
| 2024/0383504 | A1 * | 11/2024 | Jung | B60W 50/14 |
| 2025/0376185 | A1 * | 12/2025 | Kume | B60W 50/08 |
| 2026/0138627 | A1 * | 5/2026 | Osherov | B60W 50/085 |

FOREIGN PATENT DOCUMENTS

| | | | | | |
|---|---|---|---|---|---|
| JP | 2003317197 | A | | 11/2003 | |
| JP | 2005343299 | A | | 12/2005 | |
| JP | 2010128645 | A | | 6/2010 | |
| JP | 2014211787 | A | | 11/2014 | |
| JP | 2017039461 | A | | 2/2017 | |
| KR | 20230050535 | A | * | 4/2023 | B60W 40/08 |
| WO | 2020213022 | A1 | | 10/2020 | |

* cited by examiner

FIG. 4
13
SPEED IS DECREASING
SPEED OF 45 KM/H

ALARM SYSTEM

CROSS-REFERENCE TO RELATED APPLICATION

This application claims priority to Japanese Patent Application No. 2023-186823, filed on Oct. 31, 2023, the entire contents of which are incorporated herein by reference.

TECHNICAL FIELD

The present disclosure relates to an alarm system.

BACKGROUND

A line-of-sight monitoring apparatus that monitors the direction of the driver's line of sight and warns the driver if the line of sight deviates from a predetermined range using an output apparatus mounted in the vehicle is disclosed. For example, see Patent Literature (PTL) 1.

CITATION LIST

Patent Literature

PTL 1: WO 2020/213022 A1

SUMMARY

According to the prior art, when a driver is driving inattentively, the line-of-sight monitoring apparatus alarms the driver to turn the line of sight to the predetermined range. However, the line-of-sight monitoring apparatus in the prior art does not provide alarms in response to changes in vehicle travel condition caused by inattentive driving. Therefore, the driver cannot immediately respond to the deteriorating travel condition.

It would be helpful to reduce the risk of deterioration of the travel condition of a vehicle due to the driver gazing at a display of an in-vehicle apparatus.

An alarm system according to an embodiment of the present disclosure that solves the above problem is an alarm system to be mounted in a vehicle, the alarm system including:

- a display to be used for displaying information for an in-vehicle apparatus;
- an imager capable of acquiring an image including a face of a driver; and
- a controller configured to, upon determining, based on the image, that a situation in which the driver looks at the display has continued for a predetermined time period or longer, display information regarding a travel condition of the vehicle on the display.

According to the present disclosure, the risk of deterioration of the travel condition of a vehicle due to the driver gazing at a display of an in-vehicle apparatus can be reduced.

DETAILED DESCRIPTION

An embodiment of the present disclosure will be described below, with reference to the drawings. The drawings used in the following description are schematic. In addition, dimensional ratios or the like on the drawings do not necessarily match actual ones.

(Configuration of Alarm System)

Figure 1:
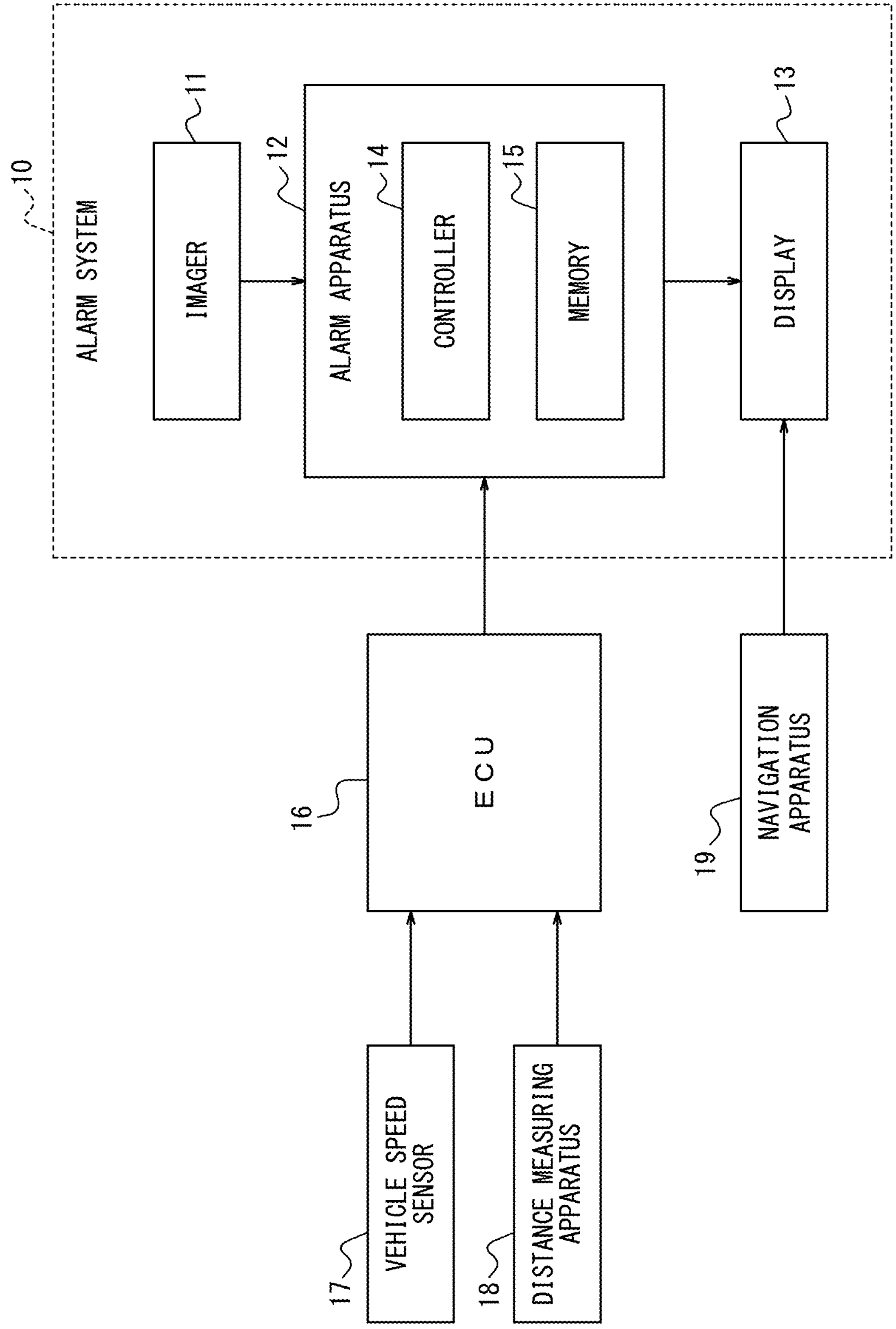
FIG. 1 is a block diagram illustrating a schematic configuration of an alarm system according to an embodiment of the present disclosure.
Figure 2:
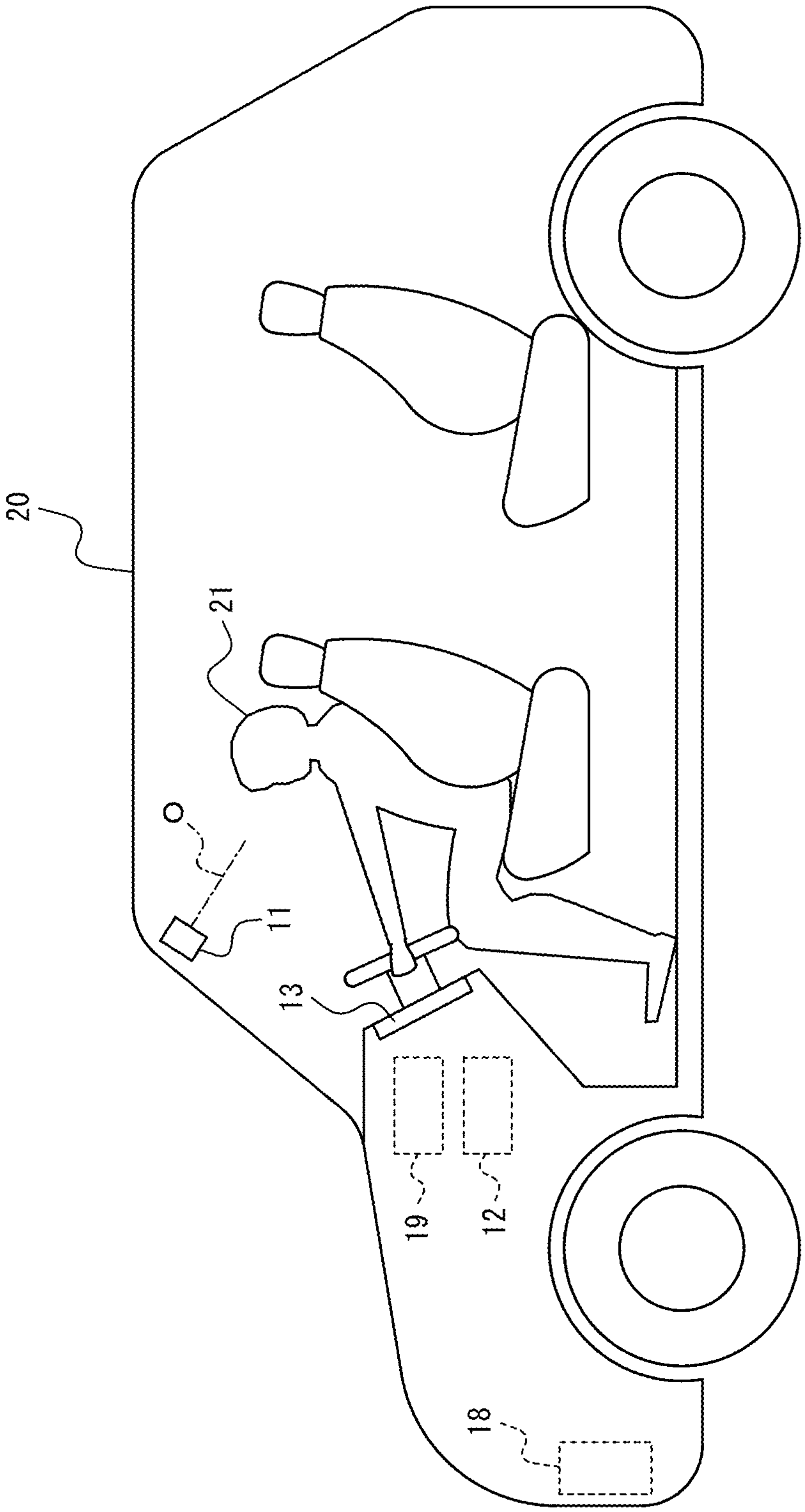
FIG. 2 is a diagram illustrating an example of an arrangement in a vehicle of each component of the alarm system in FIG. 1.

An alarm system 10 of one embodiment of the present disclosure comprises an imager 11, an alarm apparatus 12, and a display 13, as illustrated in FIG. 1. Each part of the alarm system 10 is mounted in a vehicle 20 as illustrated in the example in FIG. 2. In this application, vehicles 20 include, but are not limited to, passenger cars, trucks, buses, and large and small special-purpose automobile.

The imager 11 is a camera located in the cabin of the vehicle 20 that captures images including the face of the driver 21. The imager 11 may be located in the vehicle 20 near the room mirror, on the dashboard, or in the center of the steering wheel, etc. The imager 11 is positioned so that the face of the driver 21 is included within the field of view. For example, the optical axis O of the imager 11 is directed toward the face of the driver 21. The imager 11 outputs the captured image of the driver 21 to the alarm apparatus 12.

The alarm apparatus 12 includes a controller 14 and a memory 15. The alarm apparatus 12 is configured to acquire an image including the face of the driver 21 driving the vehicle 20 from the imager 11. The alarm apparatus 12 is configured to acquire information regarding a travel condition of the vehicle 20 from one or more ECUs (Electronic Control Units) 16 in the vehicle 20. The controller 14 of the alarm apparatus 12 can generate an alarm and display it on the display 13 based on the information acquired from the imager 11 and the ECU 16.

Information regarding the travel condition of the vehicle 20 includes information on a travel speed of the vehicle 20, information on an inter-vehicle distance between the vehicle 20 and the vehicle that travels ahead, and information indicating changes in travel speed and inter-vehicle distance. Information regarding the travel condition is not limited to information regarding the travel speed and the inter-vehicle distance. For example, information regarding travel conditions may include information about steering angle and information regarding wobble and lane departure of the vehicle 20.

The controller 14 includes at least one processor, at least one programmable circuit, at least one dedicated circuit, or any combination thereof. The processor is a general purpose processor such as a central processing unit (CPU) or a graphics processing unit (GPU), or a dedicated processor that is dedicated to specific processing. The programmable circuit is, for example, a field-programmable gate array (FPGA). The dedicated circuit is, for example, an application specific integrated circuit (ASIC). The controller 14 executes processes related to the operations of the alarm apparatus 12 while controlling the components of the alarm apparatus 12.

The memory 15 includes at least one semiconductor memory, at least one magnetic memory, at least one optical memory, or any combination thereof. The semiconductor memory is, for example, random access memory (RAM) or read only memory (ROM). The RAM is, for example, static random access memory (SRAM) or dynamic random access memory (DRAM). The ROM is, for example, electrically erasable programmable read only memory (EEPROM). The memory 15 functions as, for example, a main memory, an auxiliary memory, or a cache memory. The memory 15 stores programs to be executed by the controller 14, data to be used for the operations of the alarm apparatus 12, data obtained by the operations of the alarm apparatus 12, and the like.

The memory 15 may store the positions of the imager 11 and the display 13. For example, the memory 15 may store the position of the imager 11 and the range of the display surface on which the image of the display 13 is displayed by means of a coordinate system fixed to the vehicle 20. The memory 15 may also store the standard eye position of the driver 21 for one or more registered drivers 21. In this case, the memory 15 may store information to identify the registered driver from the facial image of the driver.

The ECU 16 is an electronic control apparatus that controls each piece of equipment in the vehicle 20. The ECU 16 includes ECUs for advanced driver assistance systems (ADAS) such as inter-vehicle distance control systems and ACC (Advanced Cruise Control System). The ECUs 16 are connected with each other via a network, such as the Controller Area Network (CAN). The ECU 16 can acquire signals from a vehicle speed sensor 17 that detects the speed of the vehicle 20 and a distance measuring apparatus 18 that measures the inter-vehicle distance between the vehicle 20 and the vehicle that travels ahead of the vehicle 20. The ECU 16 can output information on the speed of the vehicle 20 and/or the inter-vehicle distance to the alarm apparatus 12. Signals from the vehicle speed sensor 17 and the distance measuring apparatus 18 may be output to the alarm apparatus 12 without going through the ECU 16. The ECU 16 may be located at various locations inside the vehicle 20.

The vehicle speed sensor 17 is, for example, a sensor that measures the number of tire revolutions. From the number of tire revolutions per hour and the length of the tire's circumference, the speed of the vehicle 20 is calculated. The vehicle speed sensor 17 can be a sensor used for the speedometer display of the vehicle 20.

Light detection and ranging (LIDAR), millimeter wave radar, and stereo cameras are included in the distance measuring apparatus 18. Any one or more of these devices can be employed as the distance measuring apparatus 18. LIDAR and millimeter-wave radar include scanning devices that measure scattered light by scanning pulsed electromagnetic waves (infrared, millimeter waves, etc.). These distance measuring apparatuses 18 can calculate the distance to each reflection point on an object based on the time it takes for the irradiated electromagnetic waves to be reflected and detected by the object (time-of-flight). The LIDER and millimeter wave radar may be located on the front side of the vehicle 20, e.g., in the front bumper, as the distance measuring apparatus 18 in FIG. 2. Stereo cameras capture images of objects using multiple cameras arranged in parallel isotropic positions, and calculate distances based on the principle of triangulation from the parallax of the images captured by the cameras. The distance measuring apparatus 18 is not limited to those mentioned above, but can employ various devices capable of measuring distances. Stereo cameras may be located, for example, inside the windshield.

The display 13 is used for displaying information for an in-vehicle apparatus mounted in the vehicle 20. The display 13 displays images based on image signals input from in-vehicle apparatuses in the vehicle 20, including a navigation apparatus 19. As the display 13, various types of displays, such as a Liquid Crystal Display (LCD), an organic Electro-Luminescent (EL) display, and an inorganic EL display may be used. The display 13 may be embedded within the dashboard and may be located on the dashboard. When looking at the display 13, the driver 21 must move his/her line of sight from the front of the vehicle 20 to the display 13.

The navigation apparatus 19 displays a road map of the area around where the vehicle 20 is traveling and provides guidance on the route to a destination of the vehicle 20. The navigation apparatus 19 has various functions such as zooming in and out of maps, searching for destinations, and displaying nearby facilities. The navigation apparatus 19 generates image signals at all times and outputs them to the display 13. The display 13 normally displays images from the navigation apparatus 19.

(Configuration of Controller)

Figure 3:
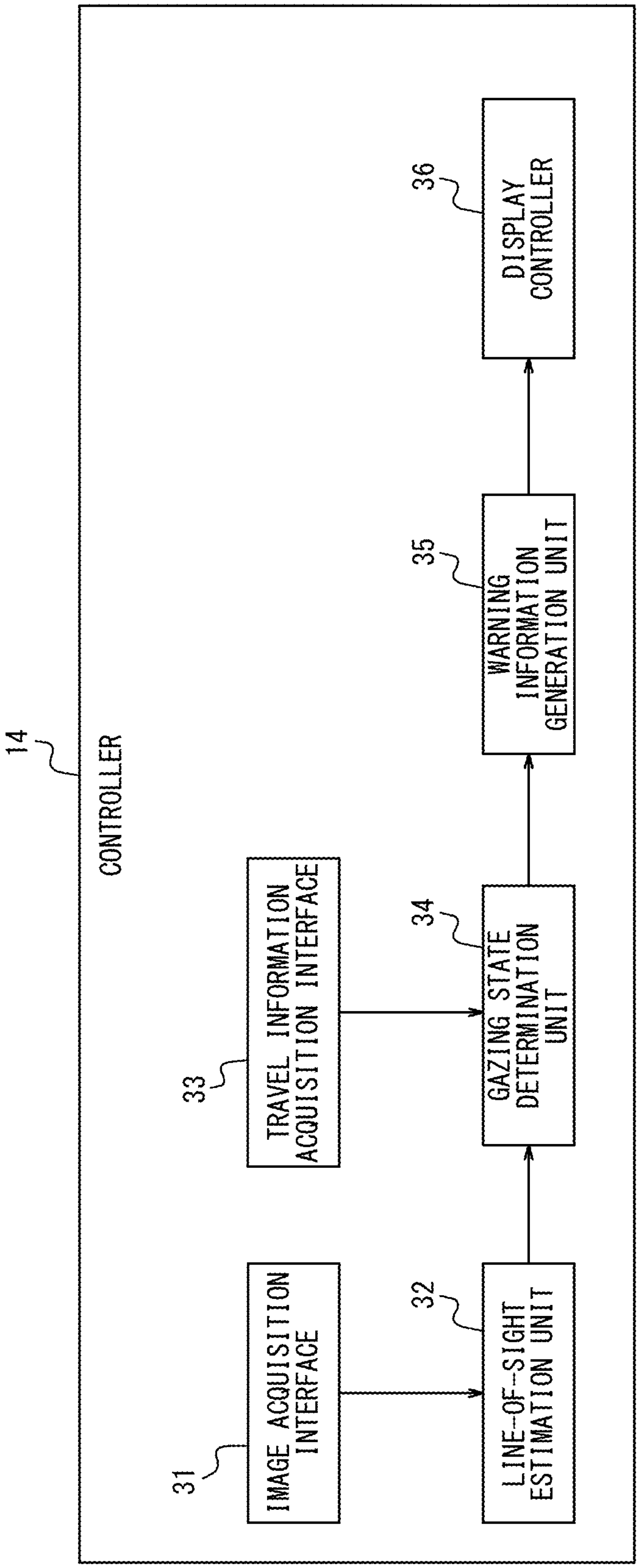
FIG. 3 is a functional block diagram of a controller in FIG. 1.

As illustrated in FIG. 3, the controller 14 includes an image acquisition interface 31, a line-of-sight estimation unit 32, a travel information acquisition interface 33, a gazing state determination unit 34, a warning information generation unit 35, and a display controller 36. Each of these components of the controller 14 may be a hardware module or a software module. Processing executed by the components can be referred to as processing executed by the controller 14.

The image acquisition interface 31 acquires image signals of the image including the face of the driver 21 from the imager 11.

The line-of-sight estimation unit 32 estimates the position and direction of the line of sight of the driver 21 from the image signals acquired from the imager 11. For example, the line-of-sight estimation unit 32 estimates the position of the eyes of the driver 21 and the direction of the line of sight of the driver 21 based on the image of the driver 21. Known methods can be employed to estimate the position of the eyes of the driver 21 and the direction of the line of sight of the driver 21. For example, methods for estimating the direction of the line of sight include using Purkinje images, using the relative positional relationship between the iris and the eye socket, approximating the pupil contour with an ellipse, and estimating from the ellipse parameter. The position of the eyes of the driver 21 may use the information stored in the memory 15 of the alarm apparatus 12 in advance for each registered driver. In this case, the controller 14 may identify the driver 21 based on the image of the driver 21's face.

The travel information acquisition interface 33 acquires from the ECU 16 information on the travel speed of the vehicle 20 and information on the inter-vehicle distance between the vehicle 20 and the vehicle that travels ahead of the vehicle 20. The travel information acquisition interface 33 may further acquire information indicating a change in travel speed, for example, information on the acceleration of the vehicle 20. The travel information acquisition interface 33 may also acquire information on the speed of change in inter-vehicle distance. The change in speed and inter-vehicle distance of the vehicle 20 may be calculated by the controller 14 based on the information on the travel speed and the information on the inter-vehicle distance, respectively.

The gazing state determination unit 34 recognizes that the driver 21 is looking at the display 13 when the line of sight of the driver 21 intersects with the display 13. Whether or not the line of sight of the driver 21 intersects with the display 13 can be determined based on the position and direction of the line of sight estimated by the line-of-sight estimation unit 32 and the position information of the display 13 stored in the memory 15.

When a situation in which the driver 21 looks at the display 13 has continued for a predetermined time period or longer, the gazing state determination unit 34 determines that the user is gazing at the display 13. In other words, in this disclosure, "gazing" means continuously looking at the display 13 for a predetermined time period or longer. The predetermined time period can be set, for example, to 1 or 2 seconds. The time that the driver 21 keeps looking at the display 13 should be less than 1 second. Depending on the surrounding environment during driving, a dangerous situation may occur if the driver 21 continues to look at the display 13 for more than 2 seconds.

The warning information generation unit 35 may set the predetermined time period to a value that differs according to the information regarding the travel condition acquired by the travel information acquisition interface 33. For example, the gazing state determination unit 34 may set the predetermined time period shorter as the traveling speed increases. For example, the gazing state determination unit 34 may set the predetermined time period shorter as the inter-vehicle distance decreases. In this way, the more likely it is that a danger will occur due to the driver 21 gazing at the display 13, the shorter the warning can be issued to the user. This reduces the possibility of hazards to the driving of the vehicle 20.

The warning information generation unit 35 generates warning information to be displayed on the display 13 when the gazing state determination unit 34 determines that the driver 21 is gazing at the display 13.

Warning information includes information regarding travel conditions. For example, warning information may include travel speed. In particular, when the travel speed is decreasing, the warning information generation unit 35 may generate warning information that the vehicle 20 is decelerating. If the travel speed is reduced because the attention of the driver 21 is directed to the display 13, it may cause irritation to the driver 21 of the following vehicle and the risk of being rear-ended. In this case, the warning information may include a notification that the speed is too low.

The warning information generation unit 35 may also generate warnings based on information on the inter-vehicle distance. For example, the warning information generation unit 35 may generate a warning when the inter-vehicle distance is shorter than a predetermined distance and when the inter-vehicle distance is reduced with a faster speed than a predetermined speed. If the inter-vehicle distance to the vehicle that travels ahead is short, or if the inter-vehicle distance is rapidly reduced, the risk of a rear-end collision with the vehicle in front may occur. In this case, the warning information may include a notification that the inter-vehicle distance is short.

Figure 4:
FIG. 4 is a diagram illustrating an example of displaying an alarm on a display in FIG. 1.

The display controller 36 displays the warning information generated by the warning information generation unit 35 on the display 13, as illustrated in FIG. 4. When the display controller 36 is displaying images output from the navigation apparatus 19, the display controller 36 may interrupt the images displayed on the display 13 to display warning information. Warning information may be toggled with images from the navigation apparatus 19. Warning information may also be superimposed on the image from the navigation apparatus 19. In addition to displaying the warning information on the display 13, the controller 14 may generate warning sounds on the loudspeakers in the vehicle 20. Furthermore, the controller 14 may be configured to reduce the audio output of the radio or other audio equipment in the vehicle 20 when displaying warning information and generating warning tones.

Thus, according to the alarm system 10 of the present disclosure, by directly displaying information on the display 13 that the driver 21 is gazing at, which informs the driver 21 of the worsening travel conditions, the driver 21 can immediately take action against the worsening travel conditions. The driver 21 can accelerate the vehicle 20 when the speed is reduced. The driver 21 can also ease off the accelerator or apply the brakes when the inter-vehicle distance is getting shorter. The alarm system of the present disclosure allows the driver 21 to respond to deteriorating travel conditions more quickly than simply encouraging the driver 21 to turn the line of sight to the front.

In the above embodiment, the warning information was superimposed on the display 13 normally used for the display of the navigation apparatus 19. Since the screen of the navigation apparatus 19 tends to be gazed at by the driver 21 for a relatively long time in order to read the displayed contents, it is highly effective to display warning information to direct the attention of the driver 21 to driving.

(Warning Indication Method)

Figure 5:
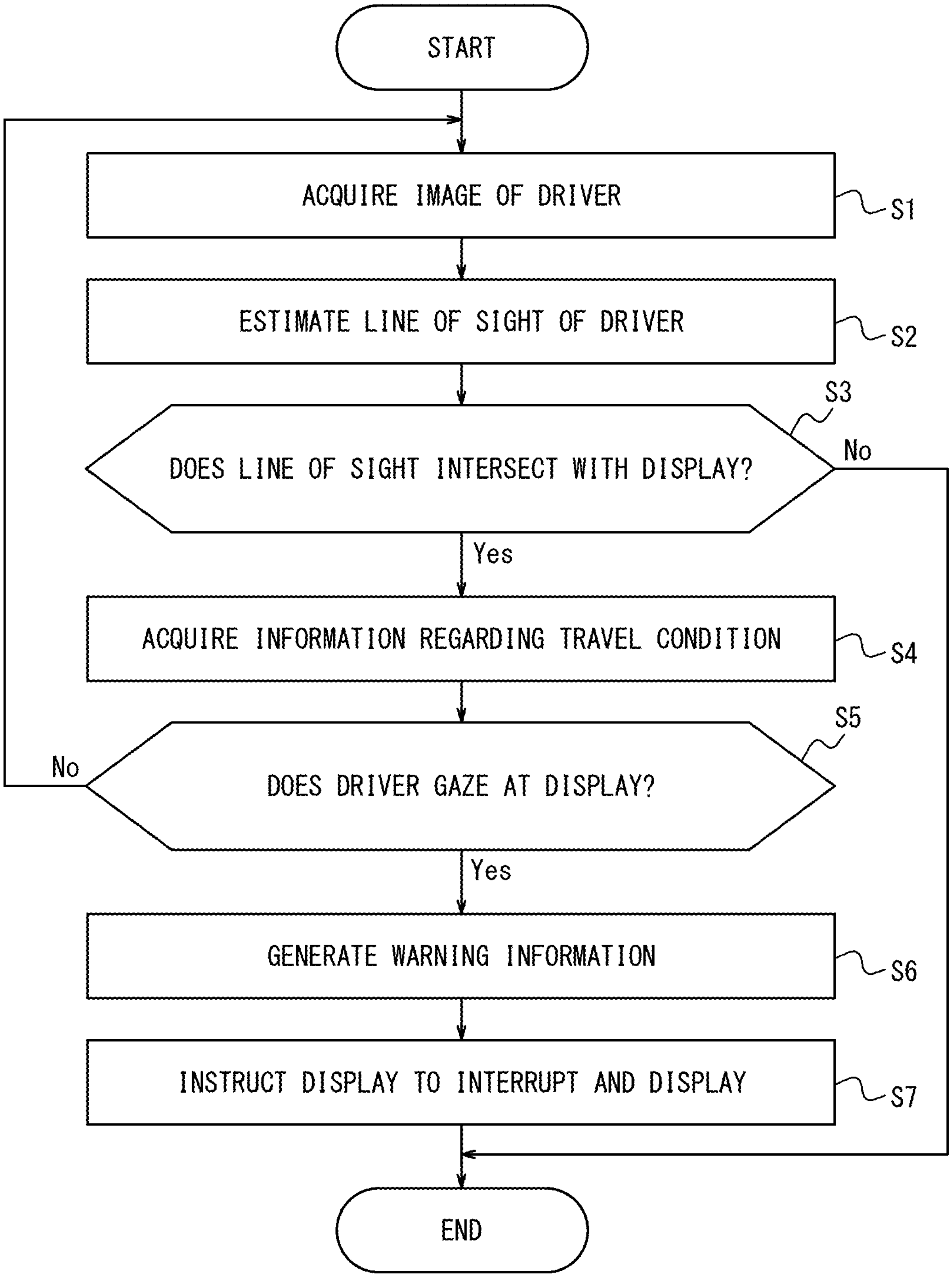
FIG. 5 is a flowchart illustrating an example of processing executed by the controller in FIG. 1.

A flow of processing executed by the controller 14 of the alarm apparatus 12 will be described below using FIG. 5. The methods disclosed herein can be performed according to a program by a processor included in the controller 14. Such a program may be stored in a non-transitory computer readable medium. Examples of non-transitory computer readable media may include, but are not limited to, a hard disk, RAM, ROM, flash memory, a CD-ROM, an optical storage device, and a magnetic storage device.

The controller 14 acquires an image including the face of the driver 21 from the image acquisition interface 31 (S1).

The controller 14 estimates the line of sight of the driver 21 based on the image of the driver 21 (S2).

The controller 14 determines whether the line of sight of the driver 21 intersects with the display 13 (S3). If the line of sight of the driver 21 intersects with the display 13, the driver 21 is perceived to be looking at the display 13.

When the line of sight of the driver 21 intersects with the display 13 in S3 (S3: Yes), the controller 14 proceeds to S4. When the line of sight of the driver 21 does not intersect with display 13 in S3 (S3: No), the driver 21 is not looking at the display 13, so the controller 14 terminates the process without performing any special processing.

The controller 14 acquires information regarding the travel condition from the ECU 16 (S4).

The controller 14 determines whether the driver 21 is gazing at the display 13 (S5), and if a situation in which the line of sight of the driver 21 intersects with the display 13 has continued for a predetermined time period, the driver 21 is judged to be gazing at the display 13.

When the driver 21 is gazing at the display 13 in S5 (S5: Yes), the controller 14 proceeds to S6. When the driver 21 is not gazing at the display 13 because the time period during which the driver 21 looks at the display 13 in S5 is less than the predetermined time period (S5: No), the controller 14 returns to S1 and continues monitoring whether the driver 21 is looking at the display 13.

The controller 14 generates warning information using the information regarding the travel conditions (S6).

The controller 14 interrupts the image of the navigation apparatus 19 displayed on the display 13 to display the warning information generated in S6 (S7).

The controller 14 can repeat the process from S1 to S7 to reduce the risk of deterioration of the travel condition of the monitored vehicle by continuously monitoring the operation of the driver 21 while the vehicle 20 is in motion. This allows the driver 21 to drive the vehicle 20 in a stable manner.

It should be noted that the present disclosure is not limited to the above embodiment, and various modifications and revisions can be implemented. For example, functions or the like included in each means, each step, or the like can be rearranged without logical inconsistency, and a plurality of means, steps, or the like can be combined into one or divided.

For example, in the above embodiment, the imager 11 captures and outputs an image including the face of the driver 21, and the controller 14 of the alarm apparatus 12 estimates the position and direction of the line of sight based on the image of the driver 21. However, the imager 11 may be an intelligent camera with image recognition functions, and the process of estimating the position and direction of the line of sight of the driver 21 may be performed by the imager 11. For example, the imager 11 may be equipped with a machine-learned model to estimate the position and direction of the line of sight based on the image of the driver. In this case, the alarm apparatus 12 acquires the position and direction of the line of sight of the driver as output from the imager 11. The controller 14 does not require the line-of-sight estimation unit 32.

The imager 11 can be a stereo camera with multiple cameras arranged in parallel, rather than a monocular camera. In this case, the controller 14 of the alarm apparatus 12 may analyze the images output from the multiple cameras to estimate the position and direction of the line of sight.

Furthermore, in the above embodiment, the controller 14 determines whether the driver 21 is looking at the display 13 based on whether the line of sight of the driver 21 crosses the display surface of the display 13 showing the image based on the image of the face of the driver 21. However, it is not essential to estimate the position and direction of the line of sight based on the face image. For example, a number of information combining various face images of the driver 21 and information on whether the driver 21 is looking at the display or not may be used as data for machine learning, so that machine learning can directly determine whether the driver is looking at the display 13 based on the face images of the driver 21.

In the above example, navigation apparatuses 19 are shown as in-vehicle apparatuses. However, the in-vehicle apparatuses are not limited to the navigation apparatuses 19. In particular, the in-vehicle apparatuses can include in-vehicle multimedia apparatuses that integrate navigation functions as well as music players, reception of various broadcasts, and communication functions linked to cell phones.

The invention claimed is:

1. An alarm system to be mounted in a vehicle, the alarm system comprising:
- a display to be used for displaying information for an in-vehicle apparatus;
- an imager capable of acquiring an image including a face of a driver; and
- a controller configured to, upon determining, based on the image, that a situation in which the driver looks at the display has continued for a predetermined time period or longer, display information regarding a travel condition of the vehicle on the display, wherein
- the information regarding the travel condition includes warning information to direct attention of the driver to driving, and
- the controller is further configured to display the warning information by interrupting an image currently being displayed on the display or by superimposing the warning information on the displayed image.

2. The alarm system according to claim 1, wherein the predetermined time period is set to a time period that differs according to the travel condition of the vehicle.

3. The alarm system according to claim 1, wherein the controller is configured to:
- acquire information on a travel speed of the vehicle; and
- display, on the display, the information on the travel speed and/or information indicating a change in travel speed as the information regarding the travel condition.

4. The alarm system according to claim 1, wherein the information regarding the travel condition includes an inter-vehicle distance between a vehicle that travels ahead of the vehicle and the vehicle, and the controller is configured to display, on the display, information on the inter-vehicle distance as the information regarding the travel condition when the inter-vehicle distance is shorter than a predetermined distance and/or when the inter-vehicle distance is reduced with a faster speed than a predetermined speed.

5. The alarm system according to claim 1, wherein the in-vehicle apparatus is a navigation apparatus configured to provide guidance on a route that the vehicle is to travel, and the controller is configured to superimpose the information regarding the travel condition on information for the navigation apparatus displayed on the display.

6. The alarm system according to claim 1, wherein the controller is configured to determine that the driver looks at the display in a case where an estimated line of sight of the driver intersects with a display surface of the display.

* * * * *